(12) United States Patent
Hirota et al.

(10) Patent No.: US 7,866,745 B2
(45) Date of Patent: Jan. 11, 2011

(54) VEHICLE SEAT

(75) Inventors: Koichi Hirota, Takahama (JP); Hitoshi Takayanagi, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 219 days.

(21) Appl. No.: 12/097,052

(22) PCT Filed: Dec. 12, 2005

(86) PCT No.: PCT/JP2005/022750

§ 371 (c)(1),
(2), (4) Date: Jun. 12, 2008

(87) PCT Pub. No.: WO2007/069289

PCT Pub. Date: Jun. 21, 2007

(65) Prior Publication Data

US 2008/0296943 A1 Dec. 4, 2008

(51) Int. Cl.
*B60N 2/42* (2006.01)
*B60R 22/00* (2006.01)

(52) U.S. Cl. .................... 297/216.12; 701/45

(58) Field of Classification Search ............... 297/391, 297/216.12, 217.3, 216.1; 701/45
See application file for complete search history.

(56) References Cited

U.S. PATENT DOCUMENTS 6,513,871 B2 * 2/2003 Bartels ................. 297/216.12

7,618,091 B2 * 11/2009 Akaike et al. .......... 297/216.12
2005/0077762 A1 * 4/2005 Kraemer et al. ........ 297/216.12

FOREIGN PATENT DOCUMENTS

| JP | 1 254496 | 10/1989 |
|---|---|---|
| JP | 2000 309242 | 11/2000 |
| JP | 2004 500273 | 1/2004 |
| JP | 2005-161932 | 6/2005 |
| JP | 2005 161932 | 6/2005 |

OTHER PUBLICATIONS

U.S. Appl. No. 12/093,731, filed May 15, 2008, Hirota, et al.
U.S. Appl. No. 12/094,166, filed May 19, 2008, Hirota, et al.

* cited by examiner

*Primary Examiner*—Milton Nelson, Jr.
(74) *Attorney, Agent, or Firm*—Oblon, Spivak, McClelland, Maier & Neustadt, L.L.P.

(57) ABSTRACT

A head rest rear portion is supported to a seat back. A head rest front portion is movable forward and backward between a full-close position that is brought into contact with or close to the head rest rear portion and a full-open position that is a predetermined distance away from the head rest rear portion. A drive mechanism moves the head rest front portion. A detection sensor provided in the head rest front portion includes an electrode having a head portion detecting antenna electrode for detecting a head portion of an occupant at a time when the head rest front portion moves in the full-open position direction, and a finger detecting antenna electrode for detecting a finger of the occupant in a rear seat or the like at a time when the head rest front portion moves in the full-close position direction.

8 Claims, 6 Drawing Sheets

VEHICLE SEAT

TECHNICAL FIELD

The present invention relates to a vehicle seat provided in a vehicle such as a motor vehicle or the like.

BACKGROUND ART

There has been known a vehicle seat which forecasts a collision from a rear side of a vehicle and moves a head rest of the seat to a forward side by a drive mechanism so as to protect an occupant. In this kind of vehicle seat, for example, as described in Japanese National Publication of Translated Version No. 2004-500273, in the case where the collision is not generated after moving forward, the head rest is moved backward by the drive mechanism, and is returned to a normal position.

DISCLOSURE OF THE INVENTION

Problem to be Solved by the Invention

However, if the occupant in its own seat or another seat grips the head rest after moving the head rest forward, there is a case that the gripping is an obstacle to a smooth backward motion of the head rest by the drive mechanism.

Means for Solving the Problem

In accordance with the present invention, there is provided a vehicle seat comprising:

a head rest rear portion supported to a seat back;

a head rest front portion movable forward and backward between a full-close position which is brought into contact with or close to the head rest rear portion and a full-open position which is a predetermined distance away from the head rest rear portion;

a drive means for moving the head rest front portion; and a detection sensor provided in the head rest front portion for detecting a head portion of an occupant at a time of moving in a full-open position direction, wherein the detection sensor is capable of detecting a finger of the occupant in a forward side in a moving direction at a time when the head rest front portion moves in a full-close position direction.

In accordance with the vehicle seat, it is possible to well detect the head portion of the occupant on the basis of a detection signal from the detection sensor at a time when the head rest front portion moves in the full-open position direction. On the other hand, in the case where the occupant in a rear seat or the like puts a finger between the head rest front portion and the head rest rear portion, it is possible to detect the finger of the occupant on the basis of the detection signal from the detection sensor at a time of moving of the head rest front portion in the full-close position direction.

Accordingly, in the case of detecting the finger between the head rest front portion and the head rest rear portion, it is possible to stop the movement of the head rest front portion in the full-close position direction or move the head rest front portion in an opposite direction.

The detection sensor may be provided with a head portion detecting antenna electrode for detecting the head portion of the occupant and a finger detecting antenna electrode for detecting the finger of the occupant.

The head portion detecting antenna electrode and the finger detecting antenna electrode may be provided on the same film.

The detection sensor may be constituted by an electrostatic capacitance type sensor, and the head portion detecting antenna electrode and the finger detecting antenna electrode may be separated from each other so as to independently detect an electrostatic capacitance.

There may be provided with a switch circuit selecting the detection signal of any one of the head portion detecting antenna electrode and the finger detecting antenna electrode.

The finger detecting antenna electrode may be invalidated at a time when the head rest front portion moves in the full-open position direction, and the head portion detecting antenna electrode may be invalidated at a time when the head rest front portion moves in the full-close position direction.

A threshold value of the detection signal from the detection sensor at a time when the head rest front portion moves in the full-open position direction may be different from a threshold value of the detection signal from the detection sensor at a time when the head rest front portion moves in the full-close position direction.

The drive means may stop the movement of the head rest front portion in the full-close position direction or may move the head rest front portion in an opposite direction in the case where the finger is detected between the head rest front portion and the head rest rear portion.

Effect of the Invention

In accordance with the vehicle seat on the basis of the present invention, in the case where the occupant in the rear seat or the like put own finger between the head rest front portion and the head rest rear portion, it is possible to detect the finger of the occupant so as to stop the movement of the head rest front portion in the full-close position direction or move the head rest front portion in the opposite direction, on the basis of the detection signal from the detection sensor at a time when the head rest front portion moves in the full-close position direction, whereby it is possible to achieve a smooth forward and backward motion of the head rest.

BRIEF DESCRIPTION OF THE DRAWINGS

FIGS. 2(*a*) and 2(*b*) are side elevational views explaining an actuation of a head rest front portion;

DESCRIPTION OF REFERENCE NUMERALS

1 vehicle seat
3 seat back
11 head rest rear portion
12 head rest front portion
14 detection sensor
15 drive mechanism (drive means)

21*a*, 41 head portion detecting antenna electrode
21*b*, 42 finger detecting antenna electrode
22, 44 film
45 switch circuit

BEST MODE FOR CARRYING OUT THE INVENTION

A description will be in detail given below of an embodiment of a vehicle seat in accordance with the present invention with reference to the drawings.

Figure 1:
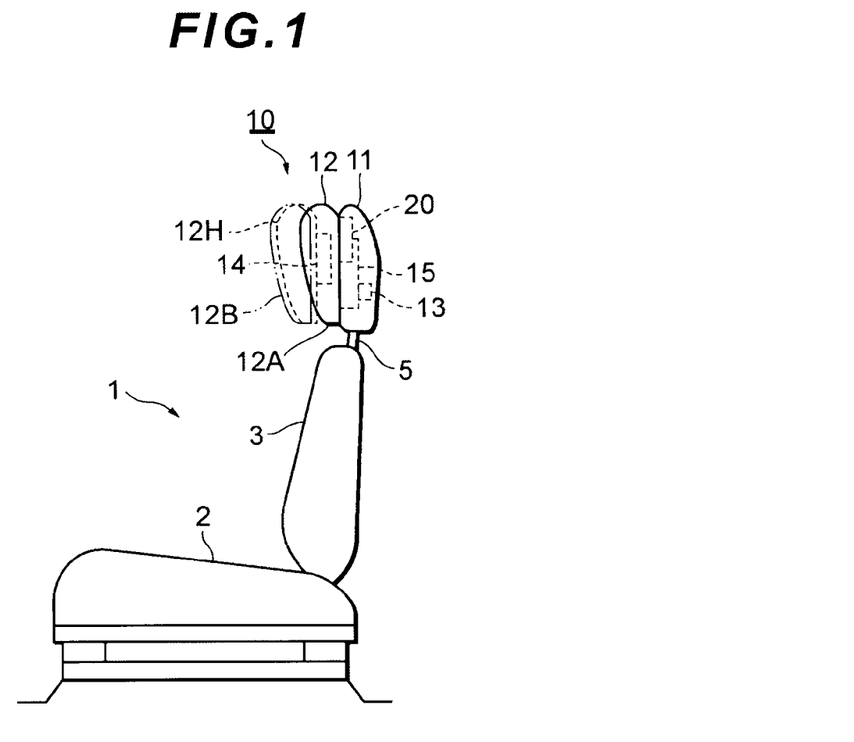
FIG. 1 is a side elevational view explaining a vehicle seat in accordance with the present invention.

FIG. 1 shows a side elevational view of a vehicle seat in accordance with the present invention. The vehicle seat 1 is arranged in a driver seat side of a vehicle, and is provided with a sitting seat 2, a seat back 3 supported to the sitting seat 2 so as to move obliquely, and a head rest device 10 for the vehicle. In this case, the present invention may be applied to a seat arranged in an assistant driver seat, or a seat arranged in a rear seat side.

The head rest device 10 for the vehicle is provided with a head rest rear portion 11, a head rest front portion 12, a motor 13 serving as a drive means for moving the head rest front portion 12 with respect to the head rest rear portion 11, a detection sensor 14 provided in the head rest front portion 12, and an ECU 20 serving as a control means for controlling the drive of the motor 13 on the basis of a detection result of the detection sensor 14 or the like.

The head rest rear portion 11 is supported to a head rest stay 5 provided in an upper end portion of the seat back 3.

The head rest front portion 12 is structured such as to be movable forward and backward between a full-close position 12A which is brought into contact with or comes close to the head rest rear portion 11 as shown by a solid line in FIG. 1 and a full-open position 12B which is a predetermined distance away from the head rest rear portion 11 as shown by a two-dot chain line in FIG. 1. At a time of a normal operation of the vehicle, the head rest front portion 12 is arranged in the full-close position 12A.

A drive mechanism 15 serving as the drive means is provided between the head rest rear portion 11 and the head rest front portion 12, and the drive mechanism 15 is driven by the motor 13 to be expanded and contracted, whereby the head rest front portion 12 moves forward and backward along a vehicle forward and backward (traveling) direction with respect to the head rest rear portion 11.

Figure 2:
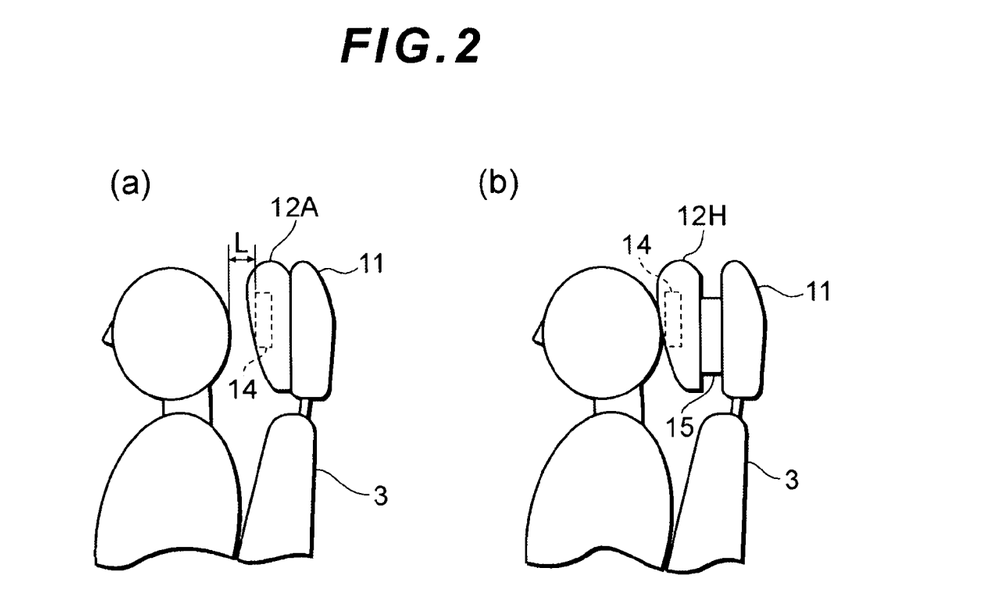

The detection sensor 14 is provided in the head rest front portion 12, and corresponds to an electrostatic capacitance type sensor having a known structure in which an electrostatic capacitance is changed in accordance with a fluctuation of a distance L shown in FIG. 2(*a*) with respect to a subject to be detected, that is, a head portion of an occupant. In the detection sensor 14, basically, a detected electrostatic capacitance value becomes large as the head portion of the occupant comes close to the detection sensor 14.

If a collision from a rear side of the vehicle is forecasted, the ECU 20 controls the motor 13 so as to move the head rest front portion 12 from the full-close position 12A to the direction of the full-open position 12B, and after that, return it to the original full-close position 12A, for example, in the case where the collision from the rear side of the vehicle is avoided after.

Further, when moving the head rest front portion 12 in the full-open position direction 12B, the ECU 20 determines an approach between the head rest front portion 12 and the head portion of the occupant on the basis of the detection result of the detection sensor 14, in detail, detects that the detection sensor 14, that is, the head rest front portion 12 comes close to the head portion of the occupant on the basis of an absolute capacitance change with respect to a reference electrostatic capacitance value of the detection sensor 14.

In more detail, when moving the head rest front portion 12 in the full-open position direction 12B, the ECU 20 sets the electrostatic capacitance value of the detection sensor 14 at a time point of starting the movement of the head rest front portion 12 in the full-open position direction 12B as the reference electrostatic capacitance value, and determines that the head rest front portion 12 comes close to the head portion of the occupant at a time when an increasing amount of the electrostatic capacitance value of the detection sensor 14 with respect to the reference electrostatic capacitance value becomes equal to or more than a predetermined threshold value.

Then, the ECU 20 moves the head rest front portion 12 in the full-open position direction 12B, and, if the ECU 20 determines that the head rest front portion 12 comes close to the head portion of the occupant, the ECU 20 stops the movement of the head rest front portion 12 at a stop position 12H of coming close to the head portion as shown in FIG. 2(*b*). On the other hand, the ECU 20 moves the head rest front portion 12 in the full-open position direction 12B, and, in the case where the approach between the head rest front portion 12 and the head portion of the occupant is not detected, the ECU 20 moves the head rest front portion 12 to the full-open position 12B shown in FIG. 1 and stops it.

Figure 3:
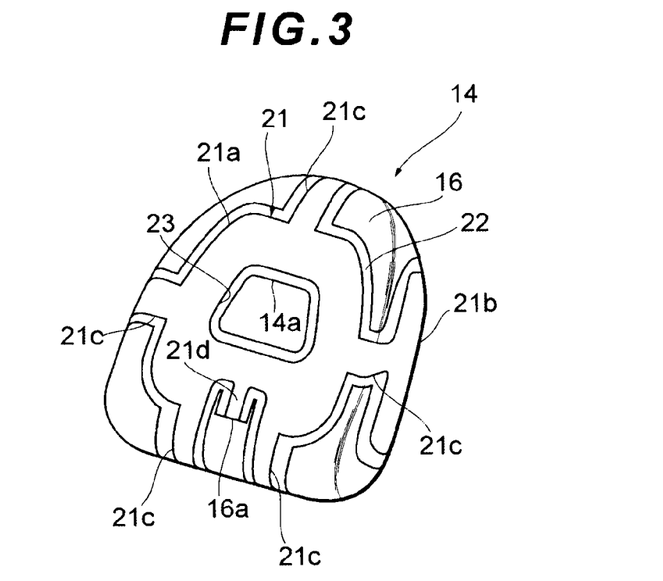
FIG. 3 is a perspective view of a cushion member to which a detection sensor is attached.
Figure 4:
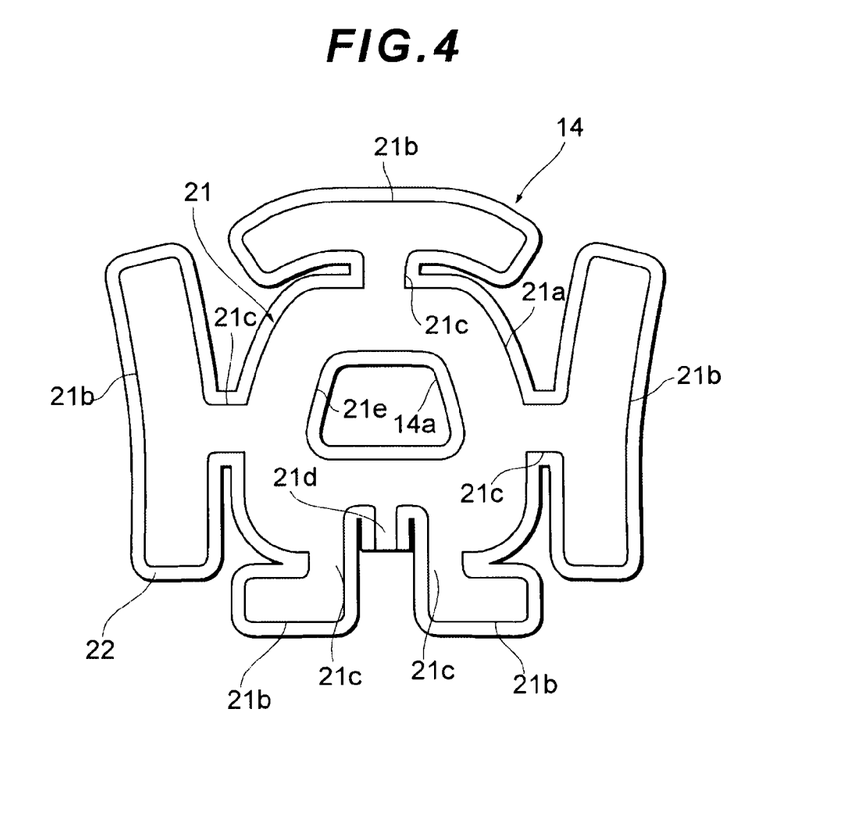
FIG. 4 is a plan view showing the detection sensor.
Figure 5:
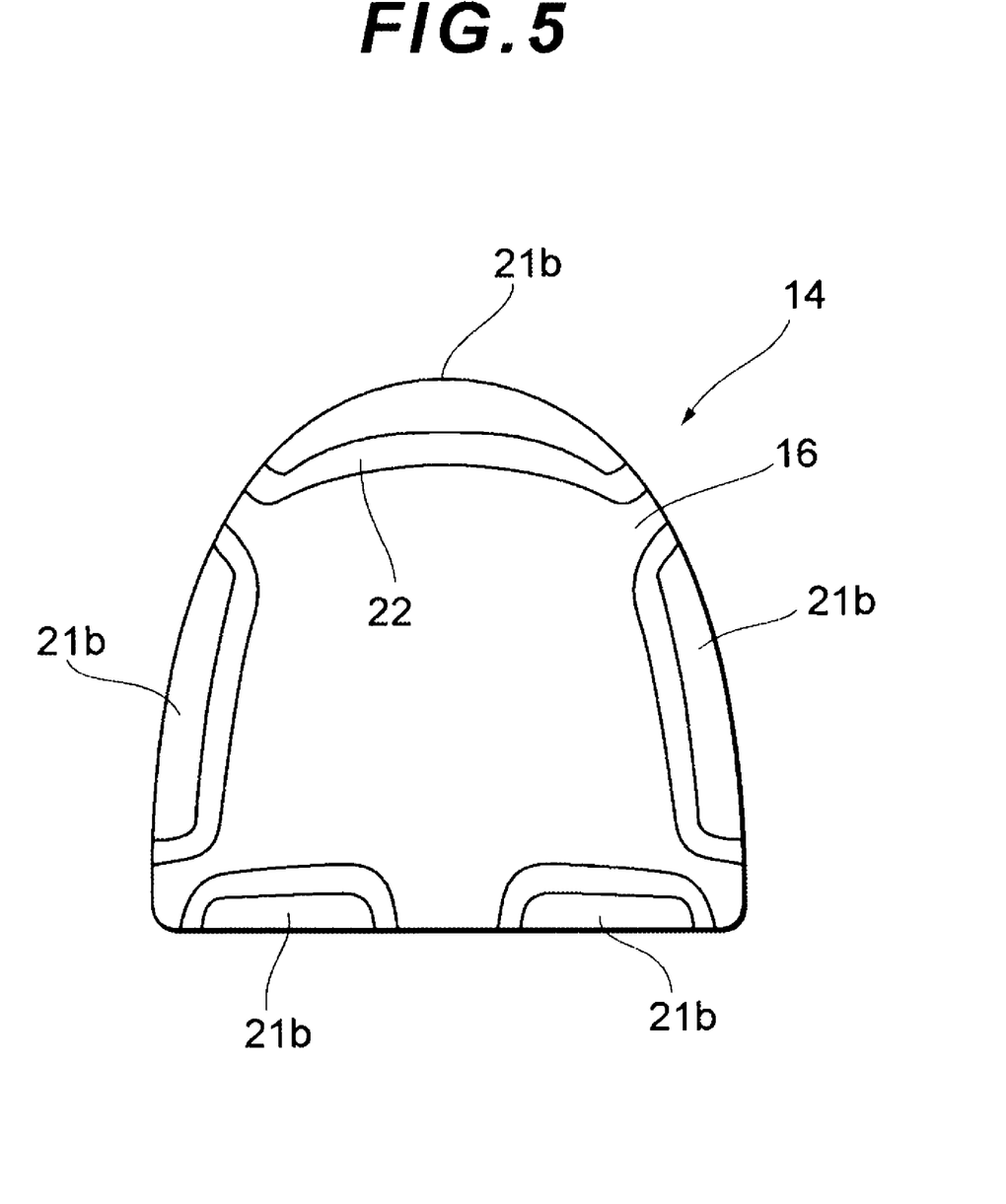
FIG. 5 is a back elevational view of the cushion member to which the detection sensor is attached.

Next, a description will be given in detail of the detection sensor 14 provided in the head rest front portion 12. FIG. 3 is a perspective view of a cushion member to which the detection sensor is attached, FIG. 4 is a plan view showing the detection sensor, and FIG. 5 is a back elevational view of the cushion member to which the detection sensor is attached.

As shown in FIG. 3, the detection sensor 14 is formed as a film shape, and is attached to a cushion member 16 within the head rest front portion 12. The detection sensor 14 is provided with an electrode 21, for example, formed by a conductor such as a silver paint, a carbon print, a copper foil or the like, and the electrode 21 is sandwiched between two films 22 made of a thin resin having a flexibility, as shown in FIG. 4. In this case, a film hole 14*a* is formed in a center portion of the detection sensor 14.

The electrode 21 is provided with a head portion detecting antenna electrode 21*a* formed as an annular shape having a hole portion 21*e* with a larger diameter than the film hole 14*a* and having a substantially constant width in a circumferential direction, and a plurality of finger detecting antenna electrodes 21*b* arranged in upper and lower sides and both side portions of the head portion detecting antenna electrode 21*a*, in a center portion of the electrode 21, and the finger detecting antenna electrodes 21*b* are coupled to the head portion detecting antenna 21*a* via coupling portions 21*c*.

The above detection sensor 14 is structured such that the head portion detecting antenna electrode 21*a* of the electrode 21 is attached to a front surface of the cushion member 16 constructing the head rest front portion 21. Further, each of the coupling portions 21*c* of the electrode 21 is bent to a side portion of the cushion member 16, and an approximately half in a width direction of the finger detecting antenna electrode 21*b* is bent to a back surface side of the cushion member 16, as shown in FIG. 5.

Further, the detection sensor 14 has a connection terminal portion 21*d* extending to a lower side from a lower portion in the center of the electrode 21, and the connection terminal portion 21*d* is introduced into a wiring hole 16*a* formed near a lower side in the front surface side of the cushion member 16, and is connected to a signal line from the ECU 20 which is wired along the head rest stay 5.

Next, a description will be given of an electric structure of the head rest device 10 for the vehicle provided in the vehicle seat 1 mentioned above.

Figure 6:
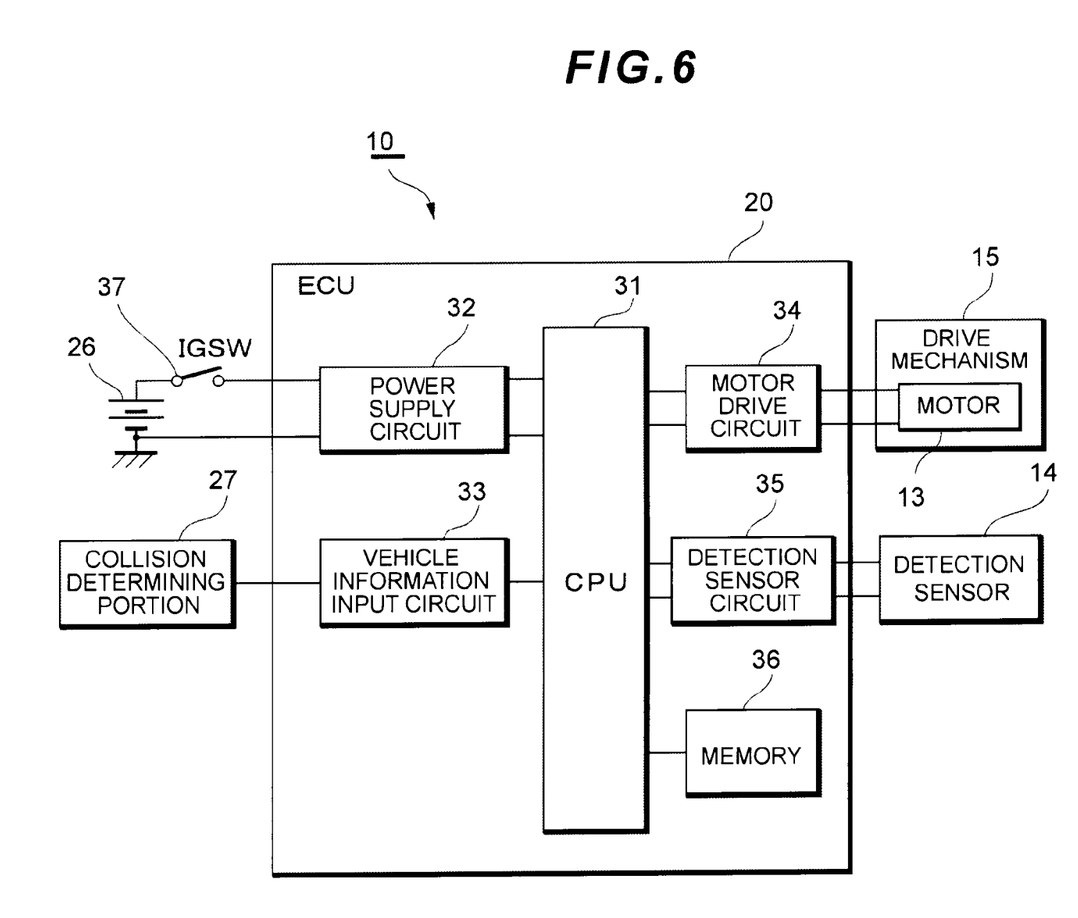
FIG. 6 is a block diagram showing an electric structure of a head rest device for a vehicle.

As shown in FIG. 6, the head rest device 10 for the vehicle is structured such as to be provided with the ECU 20, the motor 13 connected to the ECU 20, the detection sensor 14, a power supply unit 26, a collision determining portion 27 and the like.

Further, the ECU 20 is structured such as to be provided with a CPU 31, a power supply circuit 32, a vehicle information input circuit 33, a motor drive circuit 34, a detection sensor circuit 35 and a memory 36 which are connected to the CPU 31. The CPU 31 is connected to the electric power unit 26 via an ignition switch (IGSW) 37, and is structured such that an electric power is fed from the electric power unit 26 via the power supply circuit 32 on the basis of an ON operation of the ignition switch 37.

Further, the CPU 31 inputs a vehicle information such as a backward approach information or the like from the collision determining portion 27 via the vehicle information input circuit 33. The collision determining portion 27 is connected to a radar (not shown) installed in a bumper in a rear portion of the vehicle, inputs a signal from the radar to comprehensively determine a relative speed and a distance with respect to the following vehicle and a speed of the vehicle, and determines whether or not the following vehicle comes into collision with its own vehicle, or whether or not there is a possibility that the following vehicle comes into contact with its own vehicle.

The determination result is output to the vehicle information input circuit 33. Further, the CPU 31 is connected to the motor 13 via the motor drive circuit 34, and controls the motor drive circuit 34 to drive the motor 13.

In the case where a collision from the backward side of the vehicle is forecasted, the CPU 31 starts forward moving so as to move the head rest front portion 12 in the full-open position 12B direction. Then, if the CPU 31 determines that an increasing amount of an electrostatic capacitance value of the detection sensor 14 reaches a head portion detection threshold value CH stored in the memory 36, the CPU 31 stops the head rest front portion 12. Thereafter, the CPU 31 starts backward moving so a to move the head rest front portion 12 in the full-close position 12A direction and store the head rest front portion, after an elapse of a predetermined time for which the head portion of the occupant can be sufficiently protected.

In this case, if the finger exists between the head rest rear portion 11 and the head rest front portion 12 because of, for example, gripping of the head rest rear portion 11 by the occupant in the rear seat, the finger detecting antenna electrodes 21b come close to the finger in the detection sensor 14. Thereby, the electrostatic capacitance value of the detection sensor 14 is increased.

Accordingly, if the CPU 31 determines that the increasing amount of the electrostatic capacitance value of the detection sensor 14 reaches a finger detection threshold value CF stored in the memory 36 at a time of backward moving, the CPU 31 stops the head rest front portion 12. In this case, the finger detection threshold value CF is set to an electrostatic capacitance value which is smaller than the head portion detection threshold value CH.

Thereby, it is possible to smoothly move the head rest front portion 12 forward in such a manner as to prevent the head rest front portion 12 from being stopped by the detection of the finger, at a time of moving forward, and it is possible to well detect the small increase of the electrostatic capacitance by the finger to stop the head rest front portion 12, at a time of moving backward. In this case, the head rest front portion 12 may be moved in an opposite direction at a time of detecting the finger between the head rest front portion 12 and the head rest rear portion 11.

As mentioned above, in accordance with the vehicle seat on the basis of the embodiment mentioned above, it is possible to well detect the head portion of the occupant on the basis of the detection signal from the detection sensor 14 at a time when the head rest front portion 12 moves in the full-open position 12B direction. On the other hand, in the case where the occupant in the rear seat or the like puts own finger between the head rest front portion 12 and the head rest rear portion 11, it is possible to detect the finger of the occupant on the basis of the detection signal from the detection sensor 14 at a time when the head rest front portion 12 moves in the full-close position 12A direction.

Thereby, in the case of detecting the finger between the head rest front portion 12 and the head rest rear portion 11, it is possible to stop the movement of the head rest front portion 12 in the full-close position 12A direction, or move the head rest front portion 12 in the opposite direction, thus, it is possible to achieve a smooth backward motion of the head rest front portion 12.

Further, since the head portion detecting antenna electrode 21a of the electrode 21 is integrally formed with the finger detecting antenna 21b by the film 22, it is possible to achieve a low cost in comparison with the case where a plurality of electrodes are individually provided.

Further, since the threshold value CH of the increasing amount of the electrostatic capacitance value at a time of detecting the head portion is differentiated from the threshold value CF of the increasing amount of the electrostatic capacitance value at a time of detecting the finger, it is possible to suppress an erroneous detection of the head portion and the finger having the different electrostatic capacitances at a time of detecting and suitably carry out the detection.

Further, since a protrusion of a sensitivity in the center portion can be suppressed as much as possible by forming the hole portion 21e in the center portion of the head portion detecting antenna electrode 21a, it is possible to obtain a sensitivity characteristic that is substantially flat from the center over an outer circumferential side. Thereby, the detection sensor 14 can detect the head portion without being affected by a position of the head portion of the occupant in a plane direction.

Next, a description will be given of another embodiment. In this case, the same reference numerals are attached to the same structure portions as those of the embodiment mentioned above and a description thereof will be omitted.

Figure 7:
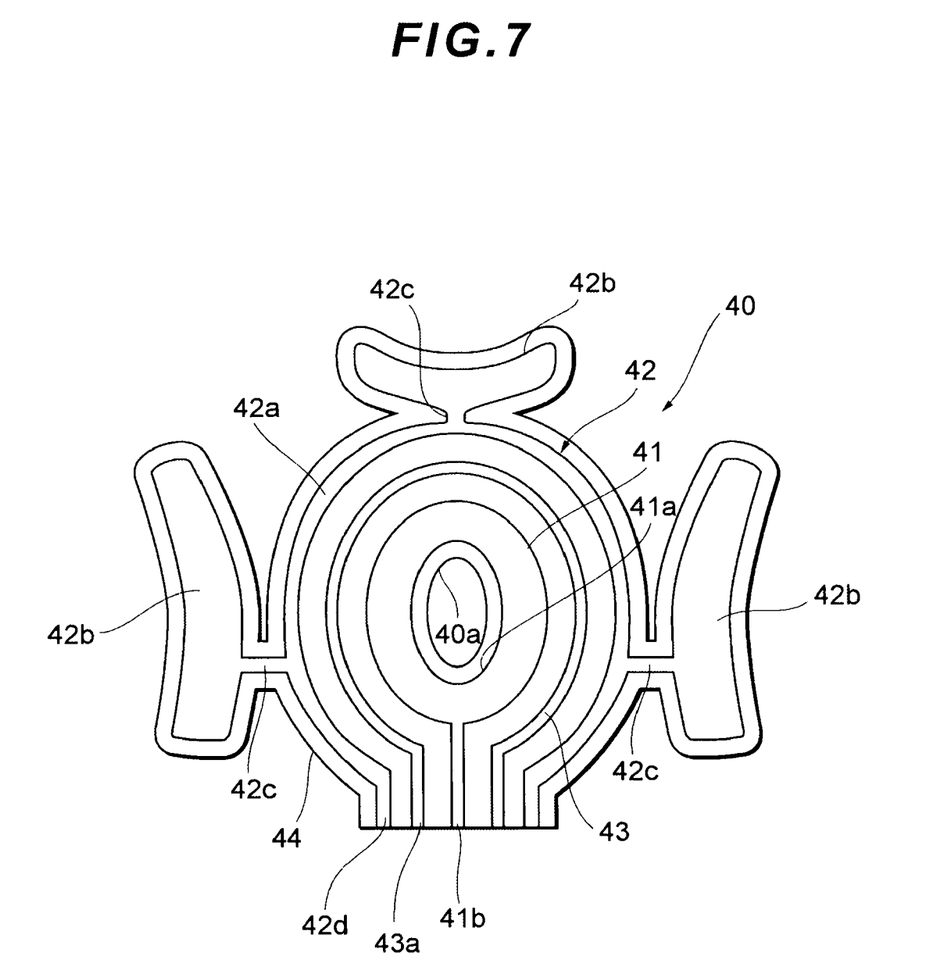
FIG. 7 is a plan view showing another detection sensor.

FIG. 7 is a plan view of an electrode constructing a detection sensor. As shown in FIG. 7, the detection sensor 40 is provided with a head portion detecting antenna electrode 41, a finger detecting antenna electrode 42 and a grand electrode 43 which are, for example, formed by a conductor such as a silver print, a carbon print, a copper foil or the like. Further, the head portion detecting antenna electrode 41, the finger detecting antenna electrode 42 and the ground electrode 43 are sandwiched between two films 44 made of a thin resin having a flexibility. A film hole 40a is formed in a center portion of the detection sensor 40.

The head portion detecting antenna electrode 41 is formed as an annular shape having a hole portion 41a with a larger diameter than the film hole 40a, in a center portion thereof, and a width thereof is substantially constant in a circumferential direction. The ground electrode 43 is formed as a band shape, and is arranged so as to be spaced along an outer circumference of the head portion detecting antenna electrode 41.

The finger detecting antenna electrode 42 has an annular connection portion 42a extending along an outer circumference of the ground electrode 43, a plurality of finger detecting antenna electrodes 42b arranged in an upper portion and both side portions of the connection portion 42a, and coupling portions 42c coupling the connection portion 42a and the finger detecting antenna electrodes 42b.

The detection sensor 40 mentioned above is structured such that the head portion detecting antenna electrode 41, the ground electrode 43 and the connection portion 42a of the finger detecting antenna electrode 42 are attached to a front surface of the cushion member 16 constructing the head rest front portion 12. Further, each of the coupling portions 42c of the finger detecting antenna electrodes 42 is bent to a sideward direction, and an approximately half in a width direction of the finger detecting antenna electrode 42b is bent to a back surface side of the cushion member 16.

Further, the detection sensor 40 has connection terminal portions 41b, 42d and 43a extending to a lower portion in the center from the head portion detecting antenna electrode 41, the finger detecting electrode 42 and the ground electrode 43, and these connection terminal portions 41b, 42d and 43a are introduced into a wiring hole 16a formed near a lower side in a front surface side of the cushion member 16 and are connected to a signal line from the ECU 20 wired along the head rest stay 5.

Figure 8:
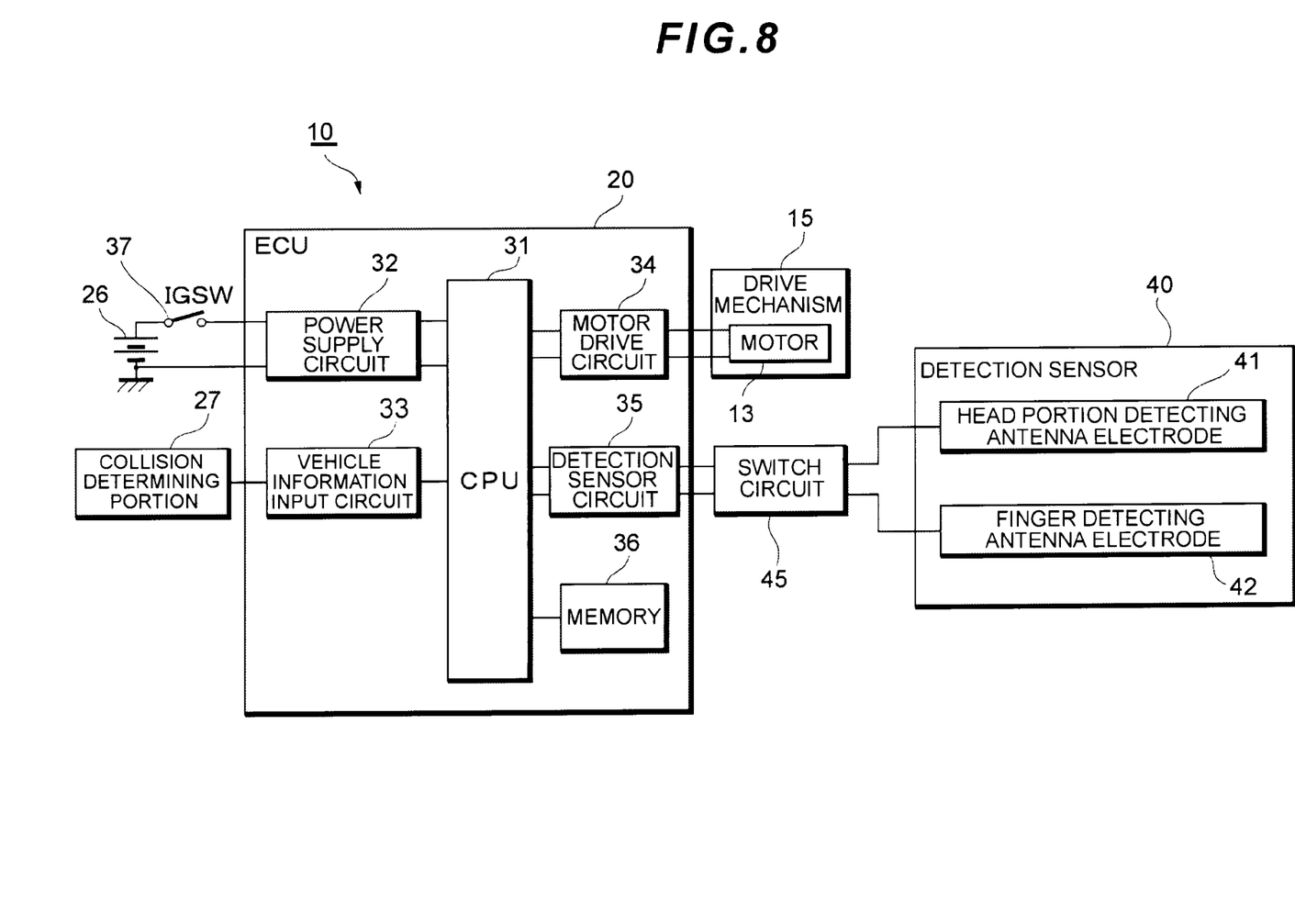
FIG. 8 is a block diagram showing an electric structure of the head rest device for the vehicle.

Then, in the head rest device 10 for the vehicle provided with the detection sensor 40, a switch circuit 45 is provided between the detection sensor 40 and the detection sensor circuit 35, as shown in FIG. 8. The switch circuit 45 transmits a detection signal from any one of the head portion detecting antenna electrode 41 and the finger detecting antenna electrode 42 to the detection sensor circuit 35, on the basis of a command from the CPU 31.

Specifically, if the collision from the rear side of the vehicle is forecasted, the CPU 31 starts the forward movement so as to move the head rest front portion 12 in the full-open position 12B direction. At this time, the switch circuit 45 transmits the detection signal from the head portion detecting antenna electrode 41 to the detection sensor circuit 35 on the basis of the command from the CPU 31. Then, if the CPU 31 determines that the increasing amount of the electrostatic capacitance value detected by the head portion detecting antenna 41 of the detection sensor 40 reaches the head portion detection threshold value CH, the CPU 31 stops the head rest front portion 12.

Thereafter, the CPU 31 starts the backward movement so as to move the head rest front portion 12 in the full-close position 12A direction and store the head rest front portion 12, after an elapse of a predetermined time for which the head portion of the occupant can be sufficiently protected. At this time, the switch circuit 45 transmits the detection signal from the finger detecting antenna electrode 42 to the detection sensor circuit 35 on the basis of the command from the CPU 31.

Thereby, if the CPU 31 determines that the increasing amount of the electrostatic capacitance value detected by the finger detecting antenna 42 of the detection sensor 40 reaches the finger detection threshold value CF stored in the memory 36 at a time of moving backward, the CPU 31 stops the head rest front portion 12.

As mentioned above, in accordance with the vehicle seat on the basis of the present embodiment, in the case where the occupant in the rear seat or the like puts own finger between the head rest front portion 12 and the head rest rear portion 11, since it is possible to detect the finger of the occupant on the basis of the detection signal from the detection sensor 40 at a time when the head rest front portion 12 moves in the full-close position 12A direction so as to stop the movement in the full-close position 12A direction of the head rest front portion 12 or move the head rest front portion 12 in the opposite direction, it is possible to achieve a smooth backward motion of the head rest front portion 12.

Further, since the head portion detecting antenna electrode 41, the finger detecting antenna electrode 42 and the ground electrode 43 are integrally formed by the film 44, it is possible to achieve a cost reduction in comparison with the structure individually provided with a plurality of electrodes.

Particularly, in this embodiment, since the head portion detecting antenna electrode 41 for detecting the head portion is separated from the finger detecting antenna electrode 42 for detecting the finger so as to be independent, it is possible to increase a detection precision of each of the head portion and the finger.

Further, since the detection signals from the head portion detecting antenna electrode 41 and the finger detecting antenna electrode 42 are switched by the switch circuit 45, it is possible to simplify the circuit structure and reduce the cost in comparison with the case that the detection sensor circuit 35 is provided in each of the head portion detecting antenna electrode 41 and the finger detecting antenna electrode 42.

Further, since the detection signal of one of the head portion detecting antenna electrode 41 and the finger detecting antenna electrode 42 is validated by the switch circuit 45, whereby the other electrode which is unnecessary for detecting the head portion or detecting the finger is invalidated, it is possible to improve a precision of the detection signal from the validated electrode.

Further, since the hole portion 41a is formed in the center portion of the head portion detecting antenna electrode 41, it is possible to suppress a protrusion of the sensitivity in the center as much as possible. Further, since an electric line of force around the head portion detecting antenna electrode 41 is oriented forward, that is, in the occupant head portion direction by the ground electrode 43 arranged around the head portion detecting antenna electrode 41, it is possible to obtain a sensitivity characteristic that is substantially flat from the center over the outer circumferential side.

Thereby, in this detection sensor 40, it is possible to detect the head portion without being affected by the position of the head portion of the occupant in the plane direction.

INDUSTRIAL APPLICABILITY

In accordance with the vehicle seat on the basis of the present invention, even in the case where the occupant in the rear seat or the like puts own finger between the head rest front portion and the head rest rear portion, it is possible to detect the finger of the occupant, and it is possible to stop the movement of the head rest front portion in the full-close position direction and move the head rest front portion in the opposite direction, therefore, it is possible to achieve the smooth backward motion of the head rest front portion. Accordingly, the present invention can be widely applied to the vehicle seat having such a demand.

The invention claimed is:

1. A vehicle seat comprising:
a head rest rear portion supported on a seat back;
a head rest front portion movable forward and backward between a full-close position which is brought into contact with or close to the head rest rear portion and a full-open position which is a predetermined distance away from the head rest rear portion;

a drive means for moving the head rest front portion; and a detection sensor provided in the head rest front portion for detecting a head portion of an occupant at a time of moving in a full-open position direction, wherein the detection sensor detects any occupant's finger that is placed between the head rest rear portion and the head rest front portion at a time when the head rest front portion moves in a full-close position direction.

2. The vehicle seat as claimed in claim 1, wherein the detection sensor is provided with a head portion detecting antenna electrode for detecting the head portion of the occupant and a finger detecting antenna electrode for detecting the finger of the occupant.

3. The vehicle seat as claimed in claim 2, wherein the head portion detecting antenna electrode and the finger detecting antenna electrode are provided on film, wherein the film is the same film.

4. The vehicle seat as claimed in claim 2, wherein the detection sensor is constituted by an electrostatic capacitance type sensor, and the head portion detecting antenna electrode and the finger detecting antenna electrode are separated from each other so as to independently detect an electrostatic capacitance.

5. The vehicle seat as claimed in claim 4, wherein the vehicle seat is provided with a switch circuit selecting the detection signal of any one of the head portion detecting antenna electrode and the finger detecting antenna electrode.

6. The vehicle seat as claimed in claim 2, wherein the finger detecting antenna electrode is invalidated at a time when the head rest front portion moves in the full-open position direction, and the head portion detecting antenna electrode is invalidated at a time when the head rest front portion moves in the full-close position direction.

7. The vehicle seat as claimed in claim 1, wherein a threshold value of the detection signal from the detection sensor at a time when the head rest front portion moves in the full-open position direction is different from a threshold value of the detection signal from the detection sensor at a time when the head rest front portion moves in the full-close position direction.

8. The vehicle seat as claimed in claim 1, wherein the drive means stops the movement of the head rest front portion in the full-close position direction or moves the head rest front portion in an opposite direction in the case where the finger is detected between the head rest front portion and the head rest rear portion.

* * * * *